J. DITTRICH & F. DEVECIS.
CALIPER GAGE.
APPLICATION FILED DEC. 28, 1909.
976,559.
Patented Nov. 22, 1910.
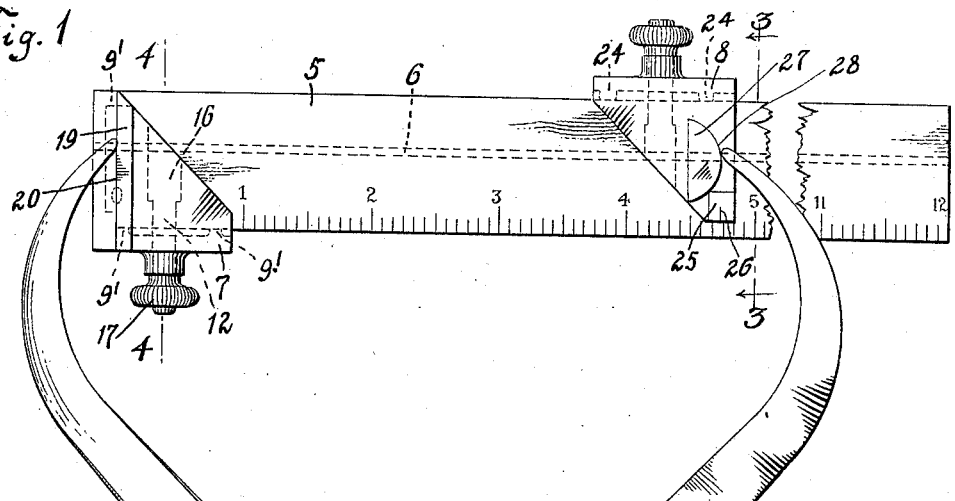
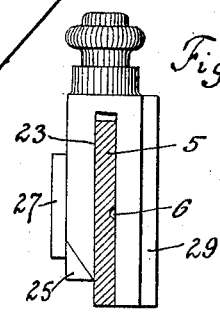
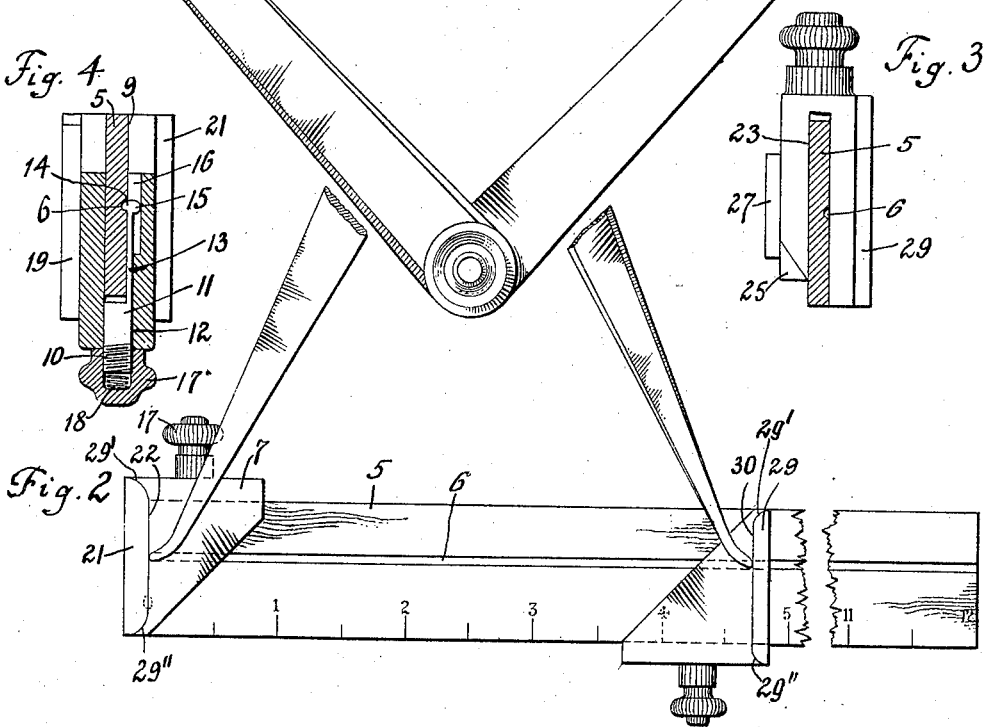
WITNESSES:
Emanuel Herzog
S. Birnbaum
Joseph Dittrich and
Frank Devecis
INVENTORS
BY
Sigmund Herzog
Their ATTORNEY

UNITED STATES PATENT OFFICE.

JOSEPH DITTRICH AND FRANK DEVECIS, OF NEW YORK, N. Y.

CALIPER-GAGE.

976,559.  Specification of Letters Patent.  Patented Nov. 22, 1910.

Application filed December 28, 1909. Serial No. 535,326.

*To all whom it may concern:*

Be it known that we, JOSEPH DITTRICH and FRANK DEVECIS, subjects of the King of Hungary, and residents of the city of New York, in the county of New York and State of New York, have invented certain new and useful Improvements in Caliper-Gages, of which the following is a specification.

The present invention relates to caliper gages.

For measuring external or internal sizes usually calipers or, as they are often called, caliper compasses are used. When it is desired to set such calipers to a predetermined diameter, the same are placed upon a graduated rule and the legs spread until the points of the same coincide with the graduation marks indicating the desired length, or they may be set by means of a caliper square by shifting the movable jaw of said square to the predetermined point upon the rule of the same and then bringing one leg of the calipers in contact with the stationary jaw and the other with the movable jaw. It will be easily seen that in setting the calipers in this way, the same are set only approximately, and cannot be used when exact, micrometric measures are to be taken.

The purpose of the present invention is to provide a caliper square which obviates the defects of the devices heretofore in use.

With these and other objects in view, which will appear as the nature of the invention is better understood, the same consists of the novel features of construction, combination and arrangement of parts which will be hereinafter fully described, pointed out in the appended claims and illustrated in the accompanying drawings, in which—

Figure 1 is a front elevation of the improved caliper square, Fig. 2 a rear elevation of the same, Fig. 3 a section taken on line 3, 3 of Fig. 1, and Fig. 4 a section taken on line 4, 4 of Fig. 1.

In the drawings, the numeral 5 indicates an ordinary rule, which may be graduated on one or both sides into inches and fractions of inches in varying systems. This rule is provided on one side of the same with a longitudinal groove 6, which is engaged by the set- and clamping-screws of the fixed and movable jaws of the caliper gage.

Upon the rule 5 are detachably mounted, in a manner hereinafter to be described, a stationary jaw 7 and a slidable jaw 8. The stationary jaw comprises a, preferably, trapeziform member having a recess 9, into which snugly fits one end of the rule 5. The edges of the rule do, however, not contact with the entire length of the walls of the recess, but only with raised portions 9', 9' therein. The stationary member 7 is kept upon the end of the rule by means of a clamping screw 10, the stem 11 of which fits into the cylindrical hole 12 in the stationary jaw 7. The inner portion 13 of the stem is greatly reduced and is provided at its ends with a finger 14, fitting the groove 6 of the rule, and with an enlargement 15, engaging the enlarged portion 16 of the hole 12, so as to prevent the disengagement of the screw 10 with the jaw 7, when the latter is detached from the rule. A nut 17 engages the screw threaded portion of the screw stem 11 to fix the same in the desired position, while a spring 18, bearing against the jaw 7 and the nut 17, serves to keep the jaw firmly in place even if the nut is somewhat loosened. Upon one face of the jaw 7 is provided a projection 19, the outer edge 20 of which is arranged at right angles to the longitudinal axis of the rule 5 and registers with the zero mark upon said rule, while upon the other face of the jaw a projection 21 is formed, the inner edge 22 of which is located at right angles to the longitudinal axis of the rule, registering also with the zero mark thereof.

The movable jaw 8 comprises also a, preferably, trapeziform member, having a recess 23, provided with raised portions 24, 24, contacting with one of the edges of the rule when the jaw is mounted upon the latter. The means for fastening the slidable jaw upon the rule are exactly the same as those of the stationary jaw. One of the faces of the movable jaw has a slanting portion 25, provided with a graduation mark 26. Upon the same face is formed a projection 27, the outer edge 28 of which is rounded; its outermost point registering with the graduation mark 26. Upon the other face of the slidable jaw is provided a projection 29, the inner face 30 of which is arranged at right angles to the longitudinal axis of the rule and registers also with the graduation mark 26. The upper and lower edges 29' and 29'' of the projections 21 and 29, are rounded, whereby the legs of the calipers can be more easily and conveniently brought into engagement with the edges 22 and 30 of the projections 21 and 29, respectively.

The operation of the device is as follows: When it is desired to set either inside or outside calipers to a predetermined length, first the stationary jaw 7 is brought into engagement with the rule 5, and the nut 17 tightened so as to hold firmly the jaw upon the rule. The movable jaw 8 is then engaged with the rule, the graduation mark 26 brought to register with the graduation upon the rule which indicates the desired length, and then the nut of the clamping screw of the movable jaw tightened so as to keep the movable jaw in the desired place. If now an external size is to be measured, the legs of an outside caliper 31 are spread, and brought into engagement with the edge 20 of the projection 19 upon the jaw 7 and with the rounded edge 28 of the projection 27 upon the jaw 8. In forcing the legs toward each other and causing the leg which contacts with the rounded edge 28 to coincide with the outermost point of said rounded edge, the exact dimension will be obtained, for the reason that the legs of the compass lie and are supported upon and by the faces of the fixed and movable jaws, whereby the shortest distance between the edge 20 and the outermost point of the edge 28 is obtained, which is, of course, the exact dimension, being a line parallel with the face of the rule 5. If it is desired to take an internal measure, the legs of an inside caliper 32 are spread and brought into contact with the edges 22 and 30 of the projections 21 and 29 of the stationary and movable jaws, respectively. By being operated in the manner above described in connection with the outside calipers, and for the same reason the same will be easily set to the desired dimension.

It is obvious that many minor changes may be made in the construction and arrangement of the several parts without departing from the spirit and scope of the invention.

What we claim is:

1. The combination with a bar having graduations on one or both of its sides, of a fixed jaw at one of the ends of said bar, projections upon the front and rear faces of said jaw arranged in such a manner that the outer edge of the projection upon the front face coincides with the inner edge of the projection upon the rear face and both edges register with the zero mark of the scale upon said bar, a slidable jaw provided with a graduation mark, and projections upon the front and rear faces of said slidable jaw, said projections being arranged in such a manner that the outermost point of the edge of the projection upon the front face coincides with the inner edge of the projection upon the rear face and both edges register with said graduation mark upon said slidable jaw.

2. The combination with a bar having graduations on one or both of its sides and a groove in one of the sides, of a fixed jaw at one of the ends of said bar, projections upon the front and rear faces of said jaw arranged in such a manner that the outer edge of the projection upon the front face coincides with the inner edge of the projection upon the rear face and both edges register with the zero mark of the scale upon said bar, a slidable jaw provided with a graduation mark, projections upon the front and rear faces of said slidable jaw, said projections being arranged in such a manner that the outermost point of the edge of the projection upon the front face coincides with the inner edge of the projection upon the rear face and both edges register with said graduation mark, and clamping means upon both jaws engaging said groove.

3. The combination with a bar having graduations on one or both of its sides, of a fixed jaw mounted detachably upon one of the ends of said bar, projections upon the front and rear faces of said jaw arranged in such a manner that the outer edge of the projection upon the front face coincides with the inner edge of the projection upon the rear face and both edges register with the zero mark of the scale upon said bar, a slidable jaw detachably mounted upon said bar provided with a graduation mark, projections upon the front and rear faces of said slidable jaw, said projections being arranged in such a manner that the outermost point of the edge of the projection upon the front face coincides with the inner edge of the projection upon the rear face and both edges register with said graduation mark.

4. The combination with a bar having graduations on one or both of its sides and a groove in one of its sides, of a fixed jaw detachably mounted upon one of the ends of said bar, projections upon the front and rear faces of said jaw arranged in such a manner that the outer edge of the projection upon the front face coincides with the inner edge of the projection upon the rear face and both edges register with the zero mark of the scale upon said bar, a slidable jaw detachably mounted upon said bar provided with a graduation mark, projections upon the front and rear faces of said slidable jaw, said projections being arranged in such a manner that the outermost point of the edge of the projection upon the front face coincides with the inner edge of the projection upon the rear face and both edges register with said graduation mark, and clamping means upon both jaws engaging said groove.

Signed at New York, in the county of New York and State of New York, this 16th day of December, A. D. 1909.

JOSEPH DITTRICH.
FRANK DEVECIS.

Witnesses:
SIGMUND HERZOG,
M. FRIEDLANDER.